(12) United States Patent
Saxena et al.

(10) Patent No.: US 9,563,178 B2
(45) Date of Patent: Feb. 7, 2017

(54) METHODS FOR COMPUTING AN ALARM TIME AND DEVICES THEREOF

(71) Applicant: Infosys Limited, Bangalore (IN)

(72) Inventors: Ashutosh Saxena, Hyderabad (IN); Nitin Singh Chauhan, Nimach (IN)

(73) Assignee: Infosys Limited, Bangalore (IN)

(*) Notice: Subject to any disclaimer, the term of this patent is extended or adjusted under 35 U.S.C. 154(b) by 61 days.

(21) Appl. No.: 14/493,800

(22) Filed: Sep. 23, 2014

(65) Prior Publication Data

US 2015/0085626 A1 Mar. 26, 2015

(30) Foreign Application Priority Data

Sep. 23, 2013 (IN) .......................... 4296/CHE/2013

(51) Int. Cl.
G06F 1/24 (2006.01)
G06F 9/00 (2006.01)
G04G 13/02 (2006.01)
H04W 4/02 (2009.01)
H04L 29/08 (2006.01)
G06Q 10/10 (2012.01)
G08B 21/24 (2006.01)
G06Q 30/02 (2012.01)

(52) U.S. Cl.
CPC .......... G04G 13/026 (2013.01); G04G 13/023 (2013.01); G06Q 10/109 (2013.01); G06Q 30/0205 (2013.01); G08B 21/24 (2013.01); H04L 67/18 (2013.01); H04L 67/22 (2013.01); H04W 4/02 (2013.01); H04W 4/025 (2013.01); H04W 4/027 (2013.01)

(58) Field of Classification Search
CPC ........... H04L 67/18; H04L 67/22; H04W 4/02; H04W 4/025; H04W 4/027; G06Q 30/0205; G06Q 10/109; G08B 21/24
See application file for complete search history.

(56) References Cited

U.S. PATENT DOCUMENTS 6,229,430 B1 5/2001 Smith
6,591,094 B1 7/2003 Bentley
6,940,395 B2 9/2005 Steinmark
(Continued)

OTHER PUBLICATIONS

"Vocera Alarm Management", retrieved from http://www.mvisum.com/mvisumalert.php on Sep. 23, 2014.
(Continued)

Primary Examiner — Xuxing Chen
(74) Attorney, Agent, or Firm — LeClairRyan, a Professional Corporation

(57) ABSTRACT

The present invention describes a system, method and computer product program for computation of alarm time. The system includes an alarm device for generating an alarm. The system also includes an alarm application hosted on the alarm device for providing at least one user defined alarm condition. The system further includes an alarm engine for receiving the user defined alarm condition, initiating a probe to receive data from data sources, processing the received alarm conditions and the received data to compute the alarm time and next probe time repeating iteratively until the next probe time is greater than the computed alarm time. The system generates alarm at the computed alarm time when the next probe time becomes greater than the alarm time.

21 Claims, 3 Drawing Sheets

(56) References Cited

U.S. PATENT DOCUMENTS

| 8,195,203 B1 | 6/2012 | Tseng |
| 2008/0082651 A1* | 4/2008 | Singh ............... H04L 67/18 709/224 |
| 2008/0102786 A1 | 5/2008 | Griffin |
| 2011/0230201 A1* | 9/2011 | Hotes ............... G01S 5/0221 455/456.1 |

OTHER PUBLICATIONS

Lukowicz, Paul et al., "AMON: A Wearable Medical Computer for High Risk Patients", Proceedings of the 6th International Symposium on Wearable Computers (ISWC '02), pp. 1-2 (2002).
"Real-Time Alerts", retrieved from http://www.alarm.com/productservices/interactive_security.aspx on Sep. 23, 2014, pp. 1-8.
"LogMate Alarm Management Software", retrieved from http://www.tipsweb.com/products-logmate/alerts_remote.asp on Sep. 23, 2014, pp. 1-2.

* cited by examiner

METHODS FOR COMPUTING AN ALARM TIME AND DEVICES THEREOF

This application claims the benefit of Indian Patent Application Filing No. 4296/CHE/2013, filed Sep. 23, 2013, which is hereby incorporated by reference in its entirety.

FIELD

The invention generally relates to the field of alarm systems, and more particularly, to methods for computing an alarm time and devices thereof.

BACKGROUND

Generally, computing devices provide opportunity to the user to be connected to the outside world. The computing devices include the computer, stationary and mobile devices examples of which can be mobiles, PDAs, tablets, smartphones or other handheld devices. Nowadays a good amount of human population is using mobile devices. These mobile devices are very useful and used by wide range of users for various purposes. Apart from the computing usage the mobile devices are also being used to generate alarm based on time conditions. The mobile devices provide options like organizer and planners for the users to plan their activities and get alarmed appropriately. These gadgets are very useful for the users on the go.

Typically alarming systems used to generate alarm on the time parameter that was set by user. Some other alarm systems were developed which have the option to define alarm based on time, location or weather condition discretely and alarms are generated based on single condition. A type of alarm systems exist which gathers data from various information systems (like geographical positioning systems, weather information system, news feeds etc.) and correlate data in order to compute alarm time condition based on multiple conditions defined by the user. These existing alarm systems try to dynamically probe the external system for getting information about location and environmental condition and continuously consume network resource and device battery.

The challenges in the field of alarm systems have continued to increase with demands for more and better techniques having greater flexibility and reliability. In addition, with the wealth of information readily available nowadays, especially because of the internet, world wide web, and other data sources, and demand of decreasing the consumption of network resources and alarm system battery a need has arisen for a new system and method for alarming a user.

Hence, there is a need of a system, method and computer product program for computation of alarm time to address the aforementioned issues.

SUMMARY OF THE INVENTION

An object of the invention is to provide a system, method and computer product program for computation of alarm time.

Another object of the invention is to be dynamic and adaptive by connecting and accessing various external systems (such as government weather service, geographical location system, traffic information system etc.) to receive the latest updates while computing the alarm condition and captures information. This allows a user to efficiently manage his or her lifestyle. For example, avoidance of tardiness to work or appointments, as well as maximizing the amount of sleep one gets, may be accomplished.

A further objective of the invention is that the system is energy efficient. The system does not continuously pull information from various external services in order to compute alarm time in device. Probing to external system is performed at computed intervals. Time interval for probing depends on type of service and last return value of probe. This mechanism reduces the communication requirement between mobile devices, system and other external services. Reduction of communication results in reduction of energy required for data transmission and processing.

An additional objective of the invention is that advertising may be substituted for an alarm signal. This is beneficial for entities trying to market products or services to users. The advertising may be targeted toward a particular user, and may include such things as advertisements for breakfast bars or coffee.

Other technical advantages are readily apparent to one skilled in the art from the following figures, descriptions, and claims.

To achieve the objectives mentioned above, a system for computing alarm time is provided. The system includes an alarm device for generating an alarm. The system also includes an alarm application hosted on the alarm device for providing at least one user defined alarm condition. The system further includes an alarm engine for receiving the user defined alarm condition, initiating a probe to receive data from at least one data source, processing the received alarm conditions and the received data to compute the alarm time and next probe time, comparing the next probe time with the computed alarm time; and repeating iteratively at next probe time the steps of probe and computation of alarm time and next probe time until the next probe time is greater than the computed alarm time.

In another embodiment, method for computing alarm time by an alarm engine is provided. The method includes receiving user defined alarm conditions. The method also includes initiating a probe based on the received alarm condition to receive data from data source. The method further includes processing the received alarm conditions and the received data to compute the alarm time and next probe time. The method also includes comparing the next probe time with the computed alarm time. The method further includes repeating iteratively at next probe time the steps of probe and computation of alarm time and next probe time until the next probe time is greater than the computed alarm time.

In yet another embodiment, a computer product program for use with a computer, for computing alarm time is provided. The computer product program includes receiving user defined alarm conditions. The computer product program also includes initiating a probe based on the received alarm condition to receive data from data source. The computer product program further includes processing the received alarm conditions and the received data to compute the alarm time and next probe time. The computer product program also includes comparing the next probe time with the computed alarm time. The computer product program further includes repeating iteratively at next probe time the steps of probe and computation of alarm time and next probe time until the next probe time is greater than the computed alarm time.

BRIEF DESCRIPTION OF DRAWINGS

The accompanying drawings, which constitute a part of this disclosure, illustrate various embodiments and aspects of present invention and together with the description, explain the principle of the invention.

DETAILED DESCRIPTION

Embodiments of the present invention include a system for computing alarm time. The system includes an alarm device which generates an alarm. The system also includes an alarm application hosted on the alarm device that provides at least one user defined alarm condition. The system also includes an alarm engine for computing alarm time based on the user defined alarm conditions, data received from data sources and next probe time.

Figure 1:
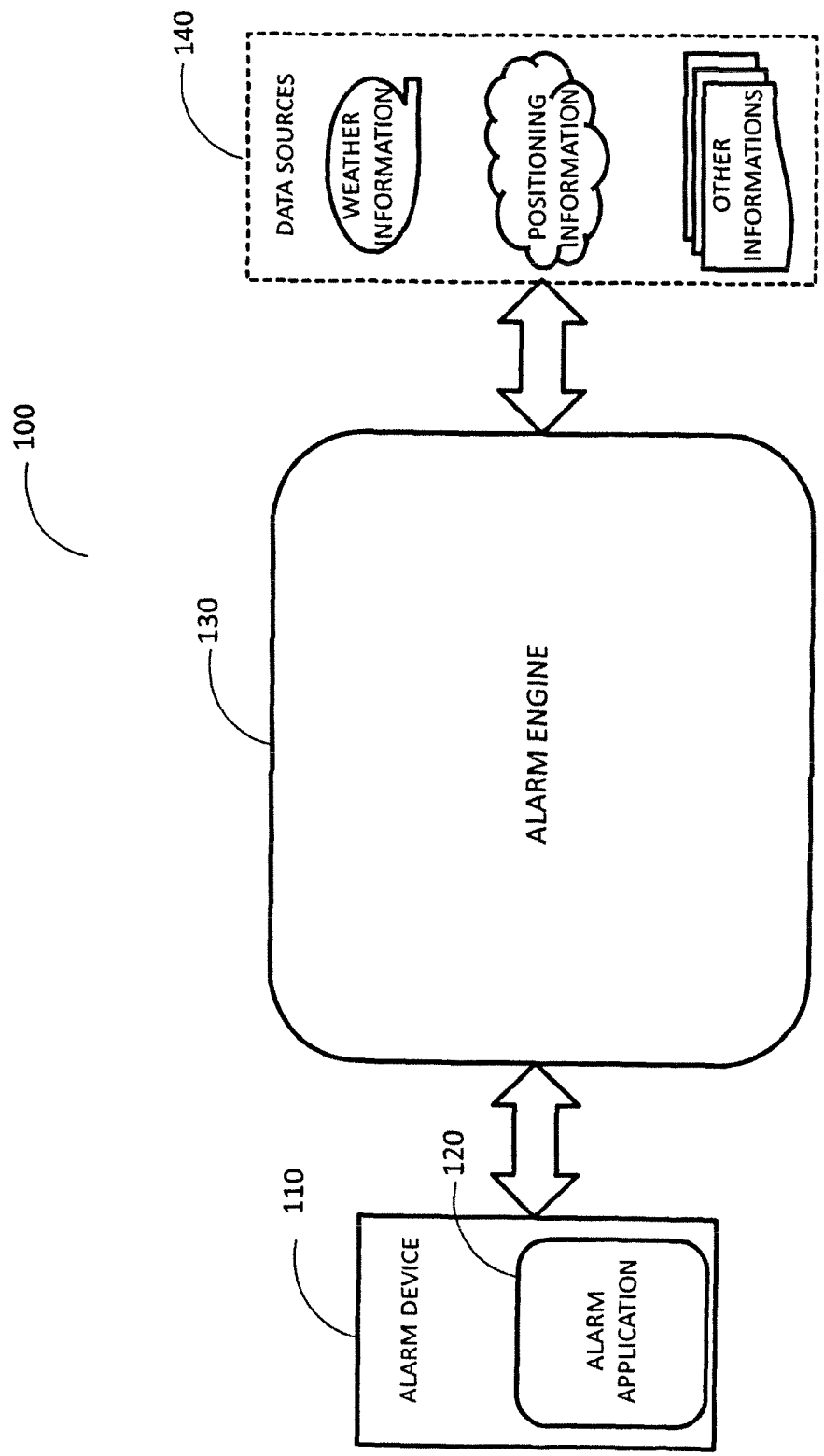
FIG. 1 is a diagrammatic representation of an alarm management computing device for computing alarm time in accordance with an embodiment of the invention.

FIG. 1 is a diagrammatic representation of a system 100 for computing alarm time and generating an alarm at the alarm time in accordance with an embodiment of the invention. The system includes an alarm device 110 for generating alarms. For the purpose of understanding the invention the alarm device is any device that can host alarm application 120 and connect to mobile or other network. The alarm device 110 connects to the alarm engine 130 that may be hosted in service provider environment. The alarm device 110 has timer and capability to generate the alarm. In one embodiment the alarm generated is an audio signal, video or visual signal, vibrating signal or combinations thereof. The alarm is generated by the alarm device 110 at the computed alarm time. The system 100 also provides an alarm application 120 that is hosted on the alarm device 110 and provides at least one user defined alarm condition. In one embodiment the alarm application provides provision to input alarm conditions and define parameters. The alarm application 120 also provides provisions to probe the alarm engine 130 for retrieving the latest alarm time and set up alarm at the alarm time. The alarm application 120 further provides interactive interface to input data and display information. In one embodiment the displayed information includes the alarm signal. The system 100 further provides an alarm engine 130 for receiving user defined alarm conditions. The alarm engine analyzes the received alarm conditions and identifies the parameters to be received for computing the alarm time. The alarm engine 130 also initiates the probe and connects to data sources 140 based on the received alarm conditions. The alarm engine 130 processes the alarm condition and data and computes the alarm time and the next probe time. The next probe time is computed based on at least one parameter from a set of current time, the probe time, the computed alarm time, the alarm conditions and the past behavioral data of the user. The alarm engine 130 further compares the next probe time with the computed alarm time. The computed alarm is communicated to the alarm device 110 hosing the alarm application 120 if next probe time is greater than or equal to the computed alarm time. An alarm is generated by the alarm device 110 at this communicated alarm time. The alarm engine 130 will again initiate another probe at the time of next probe to connect to the data repeat sources 140 and the thereafter process iteratively till the next probe time is greater than the alarm time. The alarm engine 130 will be intelligent enough to compute next probe time based on data sources 140, received alarm conditions and parameters, computed alarm time and past behavioral data of the user. The system 100 will minimize connectivity and data transmission related resource consumption significantly for alarm devices, and at the same time offers more comfort and utility by providing accurate alarm. The system 100 also provides interactive user interface to display information, prompt data entry by users and to receive associated information. The system 100 is also capable of interacting using wireline or wireless communication for data movements.

The system 100 also provide option to record history of users past behavior in handling the alarm. User behavior is recorded by feedback mechanisms in alarm system or by capturing user activity. User will receive feedback option after one or more alarm events, asking the users feedback on accuracy of post alarm events as per end alarm condition. Further, user can also record his behavioral activity in the alarm system which will be used to adjust alarm time. User can define his daily routine activity and time consumption based on his behavior pattern. For an example if user sets up an alarm condition of "reaching to office in time". In summer season, user takes 30 minutes for breakfast, 30 minutes for getting ready and 20 minutes for driving to office. If user mentions 9 AM as office time in one of the parameter and mentioned behavioral condition as other parameters system will able to adjust wakeup alarm accordingly. Same user's behavior might change in winter season and depending on local weather conditions. User will have option to change this behavioral pattern or provide feedback to system which will recalculate the alarm condition.

Figure 2:
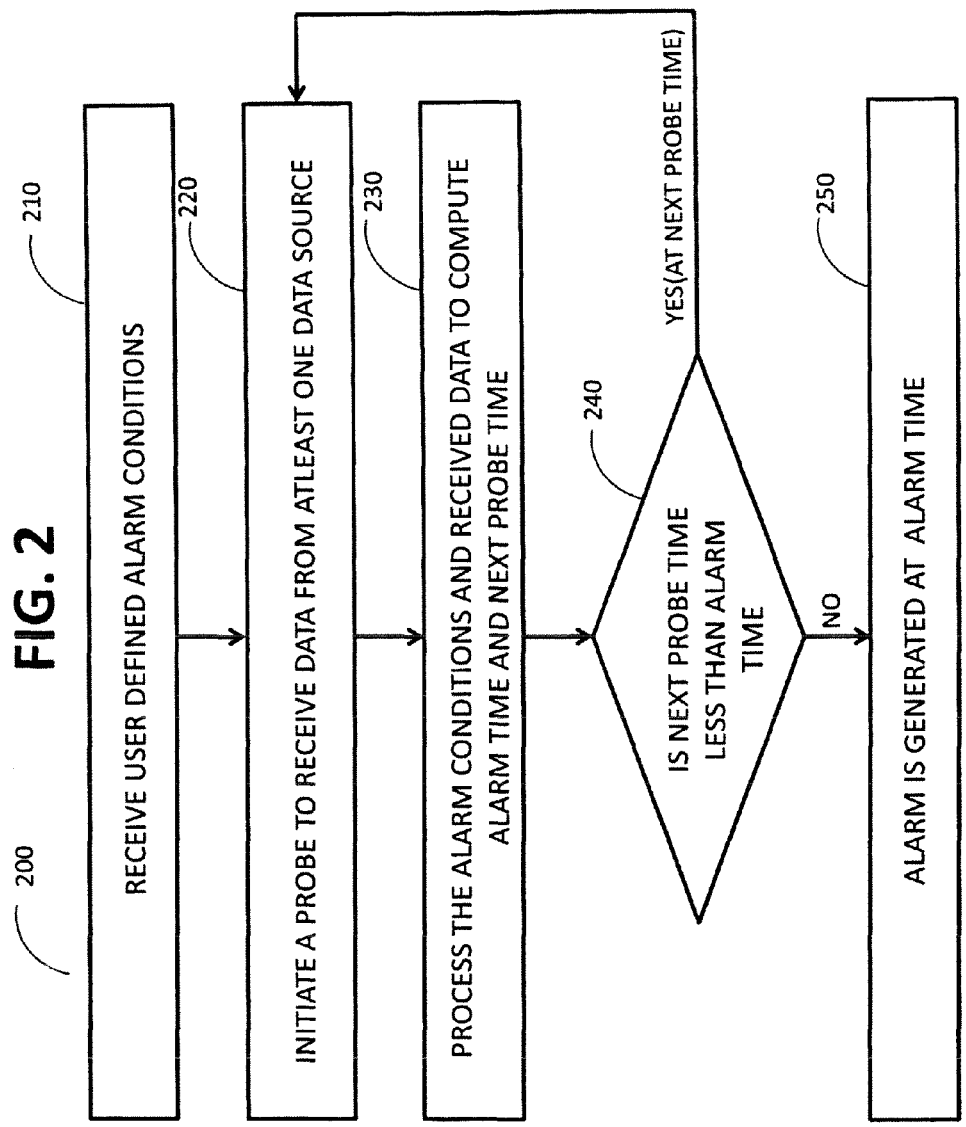
FIG. 2 is a flowchart representing steps involved in a method for computing alarm time in accordance with an embodiment of the invention.

FIG.2 is a flowchart representing the steps involved in a method 200 for computing the alarm time by an alarm engine. The method 200 includes receiving user defined alarm conditions at step 210. The user can input the desired alarm conditions for setting the alarm using interface of alarm application hosted on the alarm device. This input from the user is then transferred to the alarm engine using wireline or wireless communication channels. In one embodiment receiving user defined alarm conditions includes analyzing the user defined alarm conditions for identifying the parameters to be received for computing the alarm time. The method 200 also includes initiating a probe based on the received alarm conditions for receiving data from at least one data source at step 220. In another embodiment initiating the probe includes identifying the data sources in order to receive the data. In a specific embodiment identifying the data sources includes establishing a connection for communication with the data source. The connection with the data source is disconnected once the required data is received for processing. The method 200 further includes processing the received alarm conditions and the received data to compute the alarm time and next probe time at step 230. In an embodiment the next probe time is computed based on at least one parameter from a set of current time, the probe time, the computed alarm time, the alarm conditions and the past behavioral data of the user. In another embodiment processing the received alarm conditions and data includes communication the alarm time to the alarm application hosted on the alarm device. The method 200 also includes comparing the next probe time with the computed alarm time at step 240. The method 200 further include repeating iteratively the steps of initiating the probe 220, processing step 230 and comparison step 240 at next probe time, until the next probe time is greater than the computed alarm time. The method also includes generating an alarm at the computed alarm time if the next probe time is greater than or equal to the alarm time at step 250.

Figure 3:
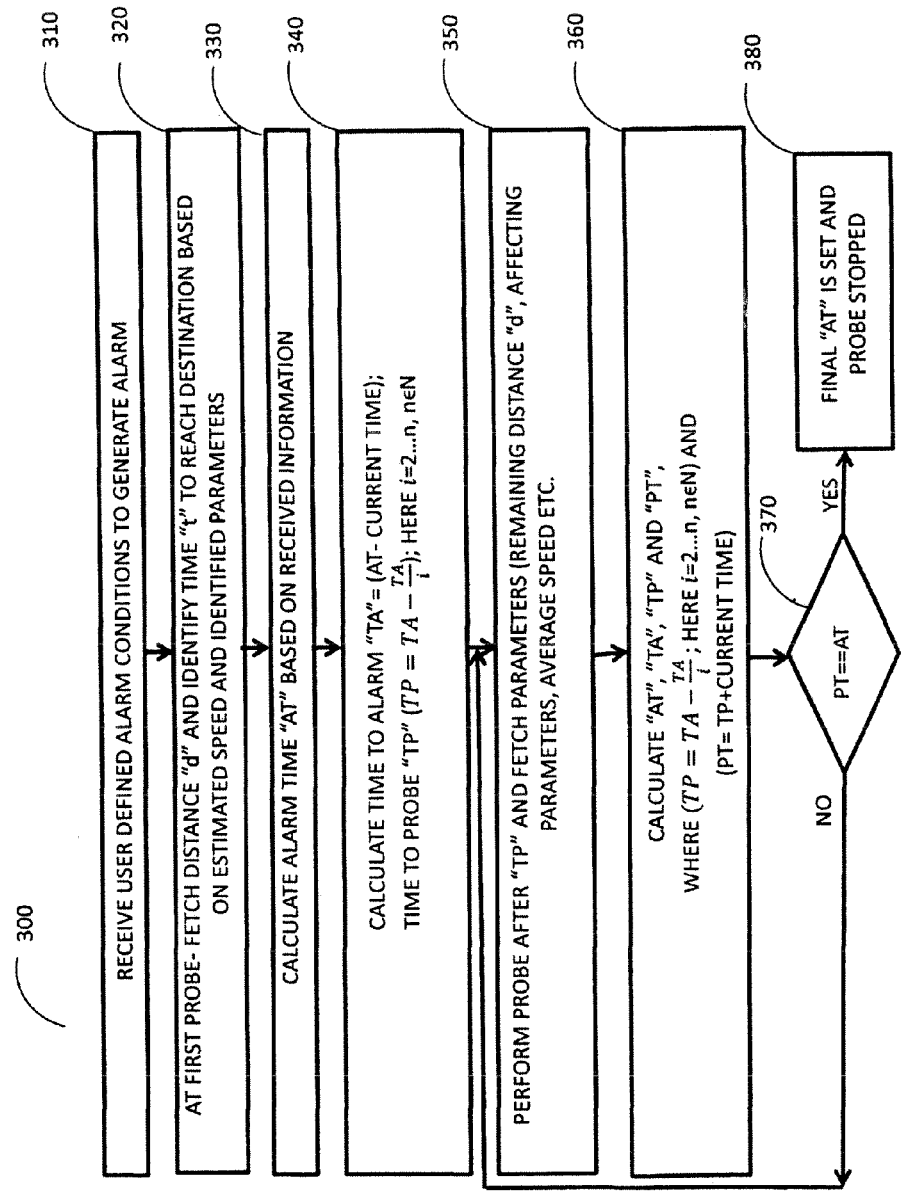
FIG. 3 is an exemplary flowchart representing steps involved in a method for computing alarm time in accordance with an embodiment of the invention.

FIG.3 is an exemplary flowchart representing the steps involved in a method 300 for computing the alarm time by an alarm engine. This example is just for explanation purpose of the invention and should not be construed as limiting the scope and boundary of the invention either in expressed or implied manner. The method 300 includes systems identifying end condition and parameters to generate alarm by the alarm engine at step 310. Assume that end condition is that raise an alarm 10 minutes before train reach destination-B, which has "d" distance from source location. So parameters can be considered here are distance and average speed of train. The method 300 also includes performing by the alarm engine first probe and it fetches distance "d" and identify time "t" to reach destination based on average speed feed in manually/or received from some other information system (such as railway system) at step 320. The method 300 further includes computing time remaining to alarm TA, which is t-10 (minutes) by the alarm engine and sets alarm time AT in the alarm device at step 330. Assume first TA is 60 minutes. The method 300 also includes computing time remaining to trigger alarm TA by given formula and computes first probe time. TP=60-60/2=30 minutes by the alarm engine at step 340. So, next probe will be performed after 30 minutes. The method further includes performing the probe after TP (30 minutes) to retrieve latest value of various parameters (distance, average speed etc.) at step 350. The method 300 also includes computing alarm time based on latest parameter values and AT is adjusted based on remaining distance, that also resets time remaining to alarm (TA) and next probe time is again computed at step 360. Assuming there is no change in estimated train movement remaining time to alarm TA will be 30 and time to next probe will be 30-30/2 (15 Minutes),In every iteration time will reduce and number of probes will keep on increasing as train reaches towards destination. At step 370 of the method 300 the alarm engine performs the probing, processing, computing and comparing steps, till next probe time is greater than alarm time. The alarm engine stops the probing when next probe time becomes greater than alarm time and final alarm is triggered at the computed alarm time at step 380.

Various embodiments of the present invention provide a method and system for computation of alarm time. The method and system, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer comprises a microprocessor, which is connected to a communication bus. The computer also includes a memory, which may include a Random Access Memory (RAM) and a Read Only Memory (ROM). The computer system also comprises a storage device, which can be a hard disk drive or a removable storage drive such as a floppy disk drive, an optical disk drive, and the like. The storage device can be other similar means for loading computer programs or other instructions into the computer system.

The computer system executes a set of program instructions that are stored in one or more storage elements, to process input data. These storage elements can also hold data or other information, as desired, and may be in the form of an information source or a physical memory element present in the processing machine. Exemplary storage elements include a hard disk, a DRAM, an SRAM and an EPROM. The storage element may be external to the computer system, and connected to or inserted into the computer, to be downloaded at or prior to the time of use. Examples of such external computer program products are computer readable storage mediums such as CD-ROMS, Flash chips, floppy disks, and the like.

The set of program instructions may include various commands that instruct the processing machine to perform specific tasks, such as the steps that constitute the method of the present invention. The set of instructions may be in the form of a computer generated code or a software program. The software or computer generated code may be in various forms, such as system or application software. Further, the software or computer generated code may be in the form of a collection of separate programs, a program module with a larger program, or a portion of a program module. The software or computer generated code may also include modular programming in the form of object-oriented programming. The software program containing the set of instructions can be embedded in a computer program product, for use with a computer, the computer program product comprising a computer usable medium with a computer readable program code that is embodied therein. Processing of input data by the processing machine may be in response to users' commands, to the results of previous processing, or to a request made by another processing machine.

What is claimed is:

1. A method for computing an alarm time comprising:
receiving, by an alarm management computing device, at least one user defined alarm condition;
initiating, by the alarm management computing device, a first probe at a first probe time based on the received alarm conditions, to receive data from at least one data source;
processing, by the alarm management computing device, the received alarm conditions and the received data to compute the alarm time and a next probe time, wherein computing the next probe time is based on at least one of a current time, the first probe time, the computed alarm time, the alarm conditions, or past behavioral data of the user;
comparing, by the alarm management computing device, the computed next probe time with the computed alarm time; and
repeating, by the alarm management computing device, the initiating, processing, and comparing iteratively at the computed next probe time, until the computed next probe time is greater than the computed alarm time.

2. The method of claim 1 further comprising:
generating, by the alarm management computing device, the alarm at the computed alarm time, when the computed next probe time is greater than or equal to the alarm time.

3. The method of claim 1, wherein receiving the user defined alarm condition comprises analyzing the user defined alarm conditions to identify parameters to be received for computing the alarm time.

4. The method of claim 1, wherein initiating the probe comprises, identifying the data sources in order to receive the data for computing the alarm time and the next probe time.

5. The method of claim 1, wherein processing the received alarm conditions and the received data comprises communicating the computed alarm time, to an alarm application.

6. The method of claim 1 further comprising:
receiving, by the alarm management computing device, the data using a wireline or a wireless communication.

7. The method of claim 1 further comprising:
providing, by the alarm management computing device, an interactive user interface for displaying information, prompting data entry by a user, or receiving the at least one user defined alarm condition.

8. An alarm management computing device comprising:
a processor; and
a memory coupled to the processor which is configured to be capable of executing programmed instructions comprising and stored in the memory to:
receive at least one user defined alarm condition;
initiate a first probe at a first probe time based on the received alarm conditions, to receive data from at least one data source;
process the received alarm conditions and the received data to compute the alarm time and a next probe time, wherein the computing the next probe time is based on at least one of a current time, the first probe time, the computed alarm time, the alarm conditions, or past behavioral data of the user;
compare the computed next probe time with the computed alarm time; and
repeat the initiating, processing, and comparing iteratively at the computed next probe time, until the computed next probe time is greater than the computed alarm time.

9. The device of claim 8, wherein the processor coupled to the memory is further configured to be capable of executing the programmed instructions further comprising and stored in the memory to generate the alarm at the computed alarm time, when the computed next probe time is greater than or equal to the alarm time.

10. The device of claim 8, wherein receiving the user defined alarm condition comprises analyzing the user defined alarm conditions to identify parameters to be received for computing the alarm time.

11. The device of claim 8, wherein initiating the probe comprises, identifying the data sources in order to receive the data for computing the alarm time and the next probe time.

12. The device of claim 8, wherein processing the received alarm conditions and the received data comprises communicating the computed alarm time, to an alarm application.

13. The device of claim 8, wherein the processor coupled to the memory is further configured to be capable of executing the programmed instructions further comprising and stored in the memory to receive the data using a wireline or a wireless communication.

14. The device of claim 8, wherein the processor coupled to the memory is further configured to be capable of executing the programmed instructions further comprising and stored in the memory to provide an interactive user interface for displaying information, prompting data entry by a user, or receiving the at least one user defined alarm condition.

15. A non-transitory computer readable medium having stored thereon instructions for computing an alarm time which when executed by a processor, cause the processor to perform steps comprising:
receiving at least one user defined alarm condition;
initiating a first probe at a first probe time based on the received alarm conditions, to receive data from at least one data source;
processing the received alarm conditions and the received data to compute the alarm time and a next probe time, wherein computing the next probe time is based on at least one of a current time, the first probe time, the computed alarm time, the alarm conditions, or past behavioral data of the user;
comparing the computed next probe time with the computed alarm time; and
repeating the initiating, processing, and comparing iteratively at the computed next probe time, until the computed next probe time is greater than the computed alarm time.

16. The medium of claim 15 further comprising stored instructions which when executed by the processor, cause the processor to perform further steps comprising:
generating the alarm at the computed alarm time, when the computed next probe time is greater than or equal to the alarm time.

17. The medium of claim 15, wherein receiving the user defined alarm condition comprises analyzing the user defined alarm conditions to identify parameters to be received for computing the alarm time.

18. The medium of claim 15, wherein initiating the probe comprises, identifying the data sources in order to receive the data for computing the alarm time and the next probe time.

19. The medium of claim 15, wherein processing the received alarm conditions and the received data comprises communicating the computed alarm time, to an alarm application.

20. The medium of claim 15, further comprising stored instructions which when executed by the processor, cause the processor to perform further steps comprising:
receiving the data using a wireline or a wireless communication.

21. The medium of claim 15, further comprising stored instructions which when executed by the processor, cause the processor to perform further steps comprising:
providing an interactive user interface for displaying information, prompting data entry by a user, or receiving the at least one user defined alarm condition.

* * * * *